(12) United States Patent
Kumawat et al.

(10) Patent No.: US 11,366,953 B1
(45) Date of Patent: Jun. 21, 2022

(54) SYSTEMS FOR SIMULTANEOUSLY MODIFYING MULTIPLE VARIABLE FONTS

(71) Applicant: Adobe Inc., San Jose, CA (US)

(72) Inventors: Nirmal Kumawat, Rajsamand (IN); Praveen Kumar Dhanuka, Howrah (IN); Arushi Jain, Delhi (IN)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 17/158,691

(22) Filed: Jan. 26, 2021

(51) Int. Cl.
*G06F 40/109* (2020.01)
*G06F 3/04842* (2022.01)
*G06F 3/04845* (2022.01)
*G06F 40/166* (2020.01)

(52) U.S. Cl.
CPC ........ *G06F 40/109* (2020.01); *G06F 3/04842* (2013.01); *G06F 3/04845* (2013.01); *G06F 40/166* (2020.01)

(58) Field of Classification Search
CPC .................................................. G06F 40/109
See application file for complete search history.

(56) References Cited

U.S. PATENT DOCUMENTS

| 5,715,473 | A | * | 2/1998 | Reed | G06F 40/109 715/210 |
| 5,995,086 | A | * | 11/1999 | Dowling | B41B 19/00 345/467 |
| 2018/0253883 | A1 | * | 9/2018 | Shanbhag | G06T 13/80 |

OTHER PUBLICATIONS

Microsoft Typography, "OpenType Font Variations Overview," Nov. 17, 2020, available at https://docs.microsoft.com/en-us/typography/opentype/spec/otvaroverview.*

* cited by examiner

*Primary Examiner* — Asher D Kells
(74) *Attorney, Agent, or Firm* — FIG. 1 Patents

(57) ABSTRACT

In implementations of systems for simultaneously modifying multiple variable fonts, a computing device implements a modification system to identify a first range of values of a glyph attribute that are adjustable by changing values of a particular design axis of a first variable font that is common to the first variable font and a second variable font. The modification system identifies a second range of values of the glyph attribute that are adjustable by changing values of the particular design axis of the second variable font. An overlapping range of values of the glyph attribute is determined between the first range of values and the second range of values. The modification system generates an additional instance of the first variable font and an additional instance of the second variable font for display in a user interface based on the overlapping range of values of the glyph attribute.

20 Claims, 12 Drawing Sheets

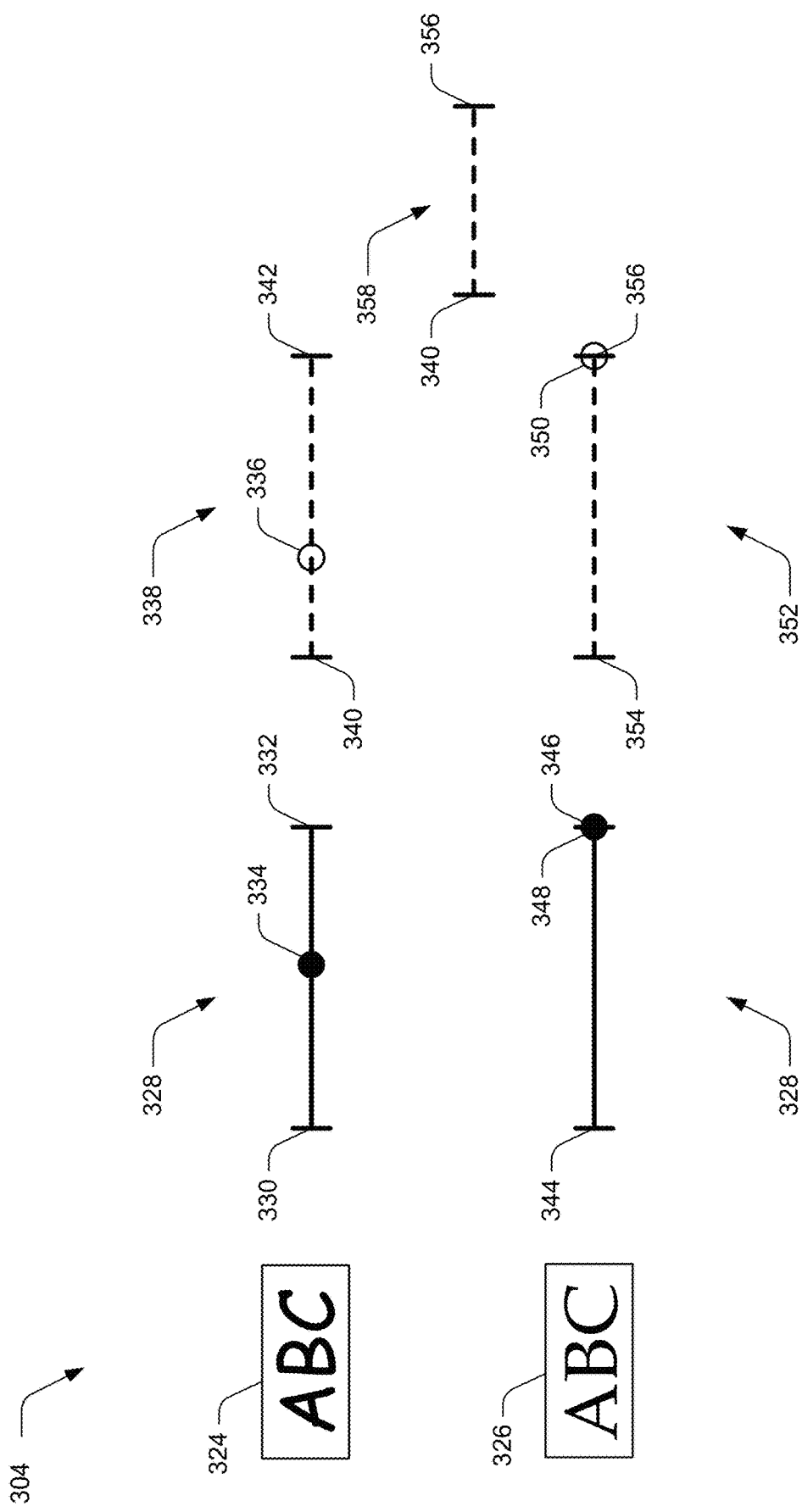

400

402
Receive input data describing a selection of glyphs rendered using an instance of a first variable font and an instance of a second variable font, the first variable font and the second variable font having a design axis in common

404
Identify a first range of values of a glyph attribute of the glyphs that are adjustable by changing values of the design axis of the first variable font

406
Identify a second range of values of the glyph attribute that are adjustable by changing values of the design axis of the second variable font

408
Determine an overlapping range of values of the glyph attribute between the first range of values and the second range of values

410
Generate, for display in a user interface of a display device, an additional instance of the first variable font and an additional instance of the second variable font based on the overlapping range of values of the glyph attribute

*Fig. 4*

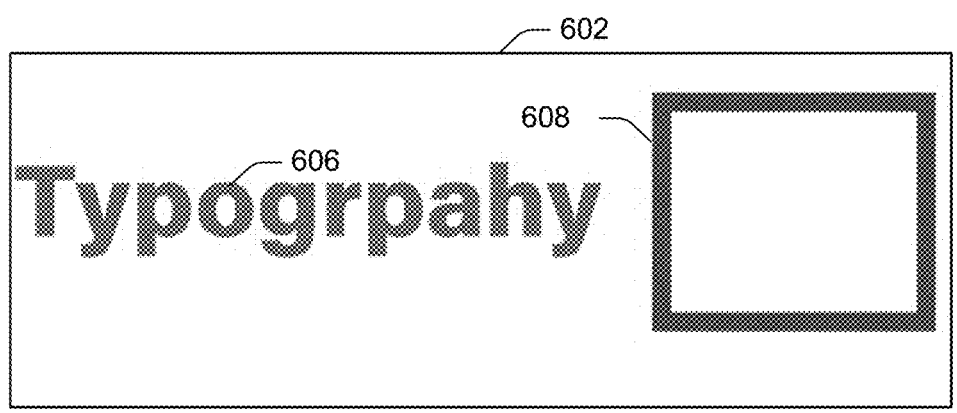
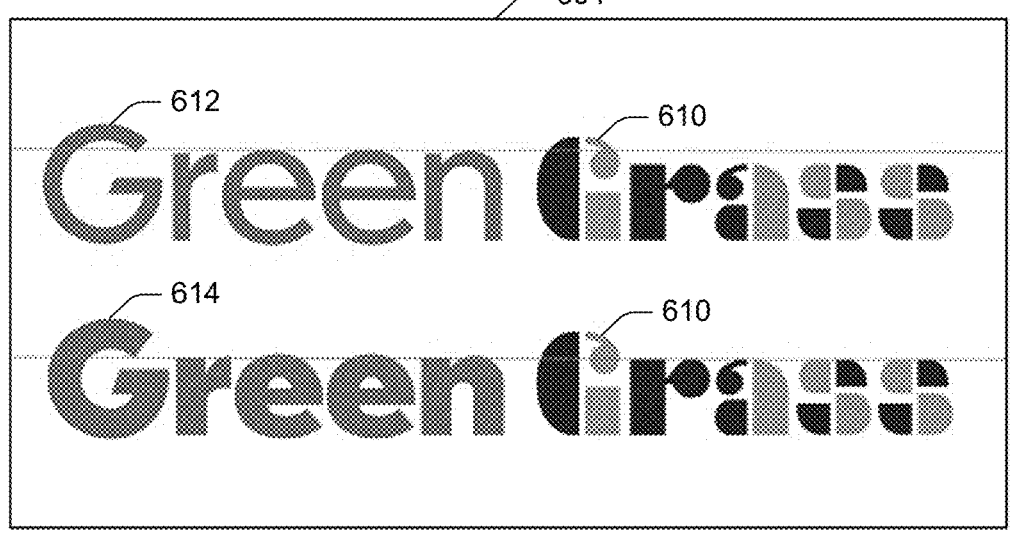
Fig. 6

SYSTEMS FOR SIMULTANEOUSLY MODIFYING MULTIPLE VARIABLE FONTS

BACKGROUND

Variable fonts are capable of incorporating multiple font faces into a single font resource by defining design axes over which font characteristics are changeable to generate different instances of the variable fonts. These different instances are usable to render glyphs having different visual features. In one example, instances of a variable font generated by increasing or decreasing values of a Weight design axis are usable to render glyphs having vertical stems with different thicknesses.

When designing instances of variable fonts, it is often beneficial to reproduce visual features of glyphs rendered using an instance of a first variable font by generating an instance of a second variable font. For example, reproducing the visual features identically or proportionally promotes visual consistency across different variable fonts, improves aesthetics of a collection of different variable fonts, makes text rendered using different variable fonts easier to read, and so forth. However, reproducing these visual features is challenging because there is no consistency between design axis values of different variable fonts. Conventional systems for reproducing visual features across instances of different variable fonts are limited to iterative adjustments of design axis values which is time consuming and tedious.

SUMMARY

Techniques and systems are described for simultaneously modifying multiple variable fonts. In an example, a computing device implements a modification system to receive input data describing a selection of glyphs rendered using an instance of a first variable font and an instance of a second variable font. The first variable font and the second variable font have a design axis in common. For example, the first and second variable fonts each have a specified range of design axis values for the design axis which are changeable to generate different instances of the variable fonts. These different instances are usable to render the glyphs having different values of a glyph attribute.

The modification system identifies a first range of values of the glyph attribute that are adjustable by changing values of the design axis of the first variable font. In an example, the modification system also identifies a second range of values of the glyph attribute that are adjustable by changing values of the design axis of the second variable font. An overlapping range of values of the glyph attribute is determined between the first range of values and the second range of values. The modification system generates an additional instance of the first variable font and an additional instance of the second variable font based on the overlapping range of values of the glyph attribute. For example, the modification system renders the glyphs using the additional instances of the variable fonts to simultaneously modify the first and second variable fonts.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures are indicative of one or more entities and thus reference is made interchangeably to single or plural forms of the entities in the discussion.

FIGS. 3A, 3B, 3C, 3D, 3E, and 3F illustrate examples of simultaneously modifying multiple variable fonts.

FIG. 4 is a flow diagram depicting a procedure in an example implementation in which a glyph attribute of glyphs rendered using an instance of a first variable font and an instance of a second variable font is simultaneously modified by generating an additional instance of the first variable font and an additional instance of the second variable font.

FIG. 6 illustrates an example of generating instances of variable fonts based on a value of a visual feature of a graphic object and based on a value of a glyph attribute of glyphs rendered using a non-variable font.

DETAILED DESCRIPTION

Overview

Figure 1:
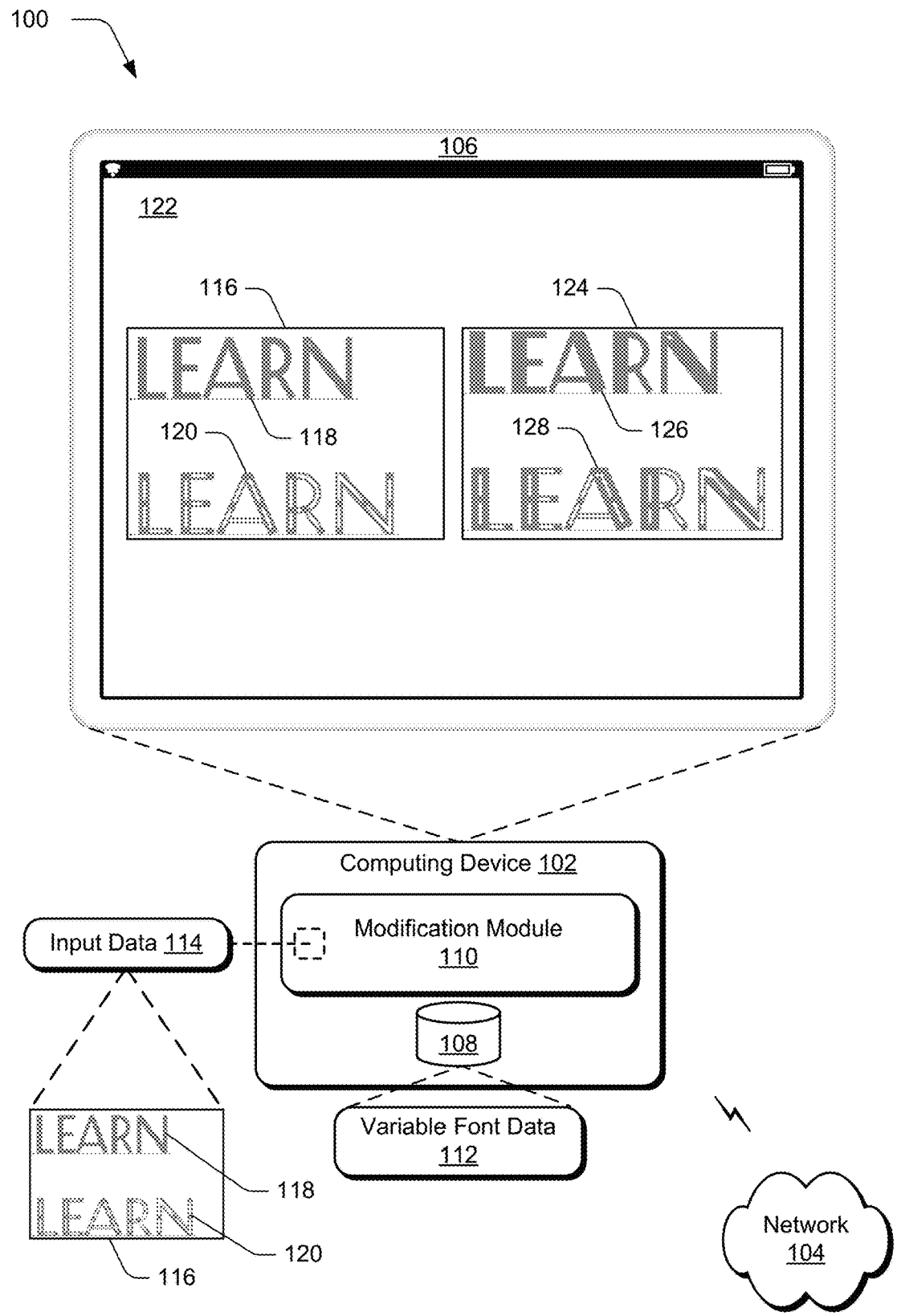
FIG. 1 is an illustration of an environment in an example implementation that is operable to employ digital systems and techniques for simultaneously modifying multiple variable fonts as described herein.

Conventional systems for reproducing a visual feature across instances of different variable fonts are limited to iteratively estimating values of a design axis of a variable font and generating instances of the variable font until a particular generated instance is usable to render glyphs that reproduce the visual feature. This iterative process is tedious and time consuming because there is no consistency between design axis values of different variable fonts. In order to overcome these limitations, systems and techniques are described for simultaneously modifying multiple variable fonts.

In one example, a computing device implements a modification system to receive input data describing a selection of glyphs rendered using an instance of a first variable font and an instance of a second variable font. The first variable font and the second variable font have a design axis in common. The design axis is a registered design axis in one example. In another example, the design axis is an unregistered design axis such as a custom design axis.

The first and second variable fonts each have a specified range of design axis values for the design axis which are changeable to generate different instances of the variable fonts. These different instances are usable to render the glyphs having different values of a glyph attribute. The modification system identifies a first range of values of the glyph attribute that are adjustable by changing values of the design axis of the first variable font. In an example, the modification system also identifies a second range of values of the glyph attribute that are adjustable by changing values of the design axis of the second variable font.

An overlapping range of values of the glyph attribute is determined between the first range of values and the second range of values. For example, the first range of values has a first minimum value and a first maximum value and the second range of values has a second minimum value and a second maximum value. In this example, the overlapping range of values has a minimum value equal to the greater of the first minimum and the second minimum and a maximum value equal to the lesser of the first maximum and the second maximum.

The modification system generates an additional instance of the first variable font and an additional instance of the second variable font based on the overlapping range of values of the glyph attribute in accordance with one of several example adjustment policies. For example, the modification system generates the additional instances based on a proportional ratio computed by dividing a value of the glyph attribute for a glyph rendered using the instance of the first variable font by a value of the glyph attribute for a glyph rendered using the instance of the second variable font. In this example, a value of the glyph attribute for a glyph rendered using the additional instance of the second variable font is equal to a value of the glyph attribute for a glyph rendered using the additional instance of the first variable font divided by the proportional ratio.

In one example, the modification system generates the additional instances such that a difference between a value of the glyph attribute for a glyph rendered using the instance of the first variable font and a value of the glyph attribute for a glyph rendered using the additional instance of the first variable font is equal to a difference between a value of the glyph attribute for a glyph rendered using the instance of the second variable front and a value of the glyph attribute for a glyph rendered using the additional instance of the second variable font. In another example, the modification system generates the additional instances of the first and second variable fonts such that a glyph rendered using the additional instance of the first variable font has a same value of the glyph attribute as a glyph rendered using the additional instance of the second variable font.

By generating the additional instances of the variable fonts in this manner, the described systems improve variable font technology. For example, the modification system renders the glyphs using the additional instances of the variable fonts to simultaneously modify the first and second variable fonts which is not possible using conventional systems that are limited to iterative adjustments of design axis values which is time consuming and tedious. The described systems further improve variable font technology by leveraging the overlapping range of values of the glyph attribute to simultaneously modify multiple variable fonts which is also not possible in conventional systems.

Term Examples

As used herein, the term "variable font" refers to a font that supports multiple font faces along at least one design axis.

As used herein, the term "design axis" refers to an axis of a variable font having a range of design axis values which are changeable within a design-variation space of the variable font to modify an attribute of glyphs rendered using instances of the variable font. By way of example, a design axis is either registered or unregistered. Examples of registered design axes include Italic, Optical Size, Slant, Width, Weight, etc. Examples of unregistered design axes include Serif, xHeight, Ascent, Descent, and so forth.

As used herein, the term "value" of a design axis or a design axis "value" refers to a particular position in the design-variation space of the variable font. By way of example, each value of the design axis is usable to generate an instance of the variable font.

As used herein, the term "instance" of a variable font refers to a font face corresponding to the particular position in the design-variation space of the variable font. By way of example, the font face of an instance of a variable font is usable to render glyphs of the variable font.

As used herein, the term "attribute" of a glyph refers to a visual feature of the glyph. Examples of attributes include Weight, Width, Slant, Optical Size, etc.

As used herein, the term "value" of a glyph attribute or a glyph attribute "value" refers to a quantification of a visual feature of a glyph that corresponds to the glyph attribute. For example, glyphs rendered using instances of different variable fonts having equal Weight values have vertical stems with thicknesses that are visually similar or indistinguishable. By way of example, glyphs rendered using instances of variable fonts having equal Slant values have vertical stems with angles relative to a y-axis of a bounding box that are visually similar or indistinguishable.

As used herein, the term "master" refers to a set of source font data that includes complete outline data for a particular font face.

In the following discussion, an example environment is first described that employs examples of techniques described herein. Example procedures are also described which are performable in the example environment and other environments. Consequently, performance of the example procedures is not limited to the example environment and the example environment is not limited to performance of the example procedures.

Example Environment

FIG. 1 is an illustration of an environment 100 in an example implementation that is operable to employ digital systems and techniques as described herein. The illustrated environment 100 includes a computing device 102 connected to a network 104. The computing device 102 is configurable as a desktop computer, a laptop computer, a mobile device (e.g., assuming a handheld configuration such as a tablet or mobile phone), and so forth. Thus, the computing device 102 is capable of ranging from a full resource device with substantial memory and processor resources (e.g., personal computers, game consoles) to a low-resource device with limited memory and/or processing resources (e.g., mobile devices). In some examples, the computing device 102 is representative of a plurality of different devices such as multiple servers utilized to perform operations "over the cloud."

The illustrated environment 100 also includes a display device 106 that is communicatively coupled to the computing device 102 via a wired or a wireless connection. A variety of device configurations are usable to implement the computing device 102 and/or the display device 106. The computing device 102 includes a storage device 108 and a modification module 110. The storage device 108 is illustrated to include variable font data 112.

The variable font data 112 describes a plurality of variable fonts available to the modification module 110. In one example, the variable font data 112 includes a font file for each of the plurality of variable fonts. These font files define design axes used by the variable fonts, adjustable values of the design axes, default or named instances of the variable fonts, and so forth.

Each variable font includes a design axis or multiple design axes. Examples of design axes include xHeight axes, Width axes, Weight axes, Italic axes, Optical Size axes, Slant axes, CapHeight axes, Ascent axes, Decent axes, etc. Every design axis includes at least one defined range of design axis values. In this example, each of the design axis values in the range corresponds to an instance of a variable font. Moreover, each instance of the variable font is usable to render glyphs of the variable font that have visual features based on a particular design axis value in the range of design axis values.

Accordingly, for any particular design axis of any particular variable font, there is a direct relationship between the design axis values of the particular design axis and visual features of glyphs rendered using instances of the particular variable font. The visual features of the glyphs rendered using different instances of the variable font are also describable as glyph attributes having different glyph attribute values. Examples of glyph attributes include Weight, Width, Slant, Italic, xHeight, CapHeight, Ascent, Decent, and so forth. Weight denotes a thickness of a glyph's horizontal or vertical stem such as thickness of a vertical stem of a capital letter "I" which is measured horizontally. Width describes a distance between consecutive glyph origins and Slant refers to an angle between an upward y-direction of a glyph's bounding box and the glyph's vertical stem. Italic denotes Slant having a 12 degree angle value. CapHeight refers to a height of a capital Latin letter such as the letter "I" and xHeight refers to a height of a lowercase Latin letter such as the letter "x" measured from a baseline. Ascent and Descent denote a maximum height above a baseline reached by a glyph and a maximum height below the baseline reached by the glyph, respectively.

For example, a first design axis value of the particular design axis is usable to generate a first instance of the particular variable font which is usable to render glyphs having a first glyph attribute value. In this example, the first glyph attribute value is a first visual feature of the glyphs. Continuing the example, a second design axis value of the particular design axis is usable to generate a second instance of the particular variable font. The second instance of the particular variable font is useable to render glyphs having a second glyph attribute value which is a second visual feature of the glyphs. The variable font data 112 describes relationships between design axis values and corresponding glyph attribute values for each design axis included in every variable font available to the modification module 110.

The modification module 110 is illustrated as receiving input data 114. In the illustrated example, the input data 114 describes a selection of glyphs 116 rendered using an instance of a first variable font 118 and an instance of a second variable font 120. As shown, the modification module 110 renders the selection of glyphs 116 in a user interface 122 of the display device 106.

The modification module 110 processes the input data 114 and/or the variable font data 112 and determines a design axis that is common to both the first variable font 118 and the second variable font 120. Once this design axis is determined, the modification module 110 identifies a first range of values of a glyph attribute that are adjustable by changing values of the design axis of the first variable font 118. For example, the modification module 110 identifies a second range of values of the glyph attribute that are adjustable by change values of the design axis of the second variable font 120.

The modification module 110 determines an overlapping range of values of the glyph attribute between the first range of values and the second range of values. For example, the modification module 110 uses the overlapping range of values to generate a selection of glyphs 124 that are rendered using an additional instance of the first variable font 126 and an additional instance of the second variable font 128. As shown, this selection of glyphs 124 is displayed in the user interface 122.

In this example, the input data 114 also describes a user input relative to the selection of glyphs 116 indicating an increase in a Weight attribute value. Thus, the glyph attribute is the Weight and the modification module 110 generates the selection of glyphs 124 as having an increased Weight value relative to the selection of glyphs 116 based on the input data 114 and the variable font data 112. As illustrated in FIG. 1, the modification module 110 simultaneously modifies the Weight of the selection of glyphs 116 by generating the additional instance of the first variable font 126 and the additional instance of the second variable font 128.

Figure 2:
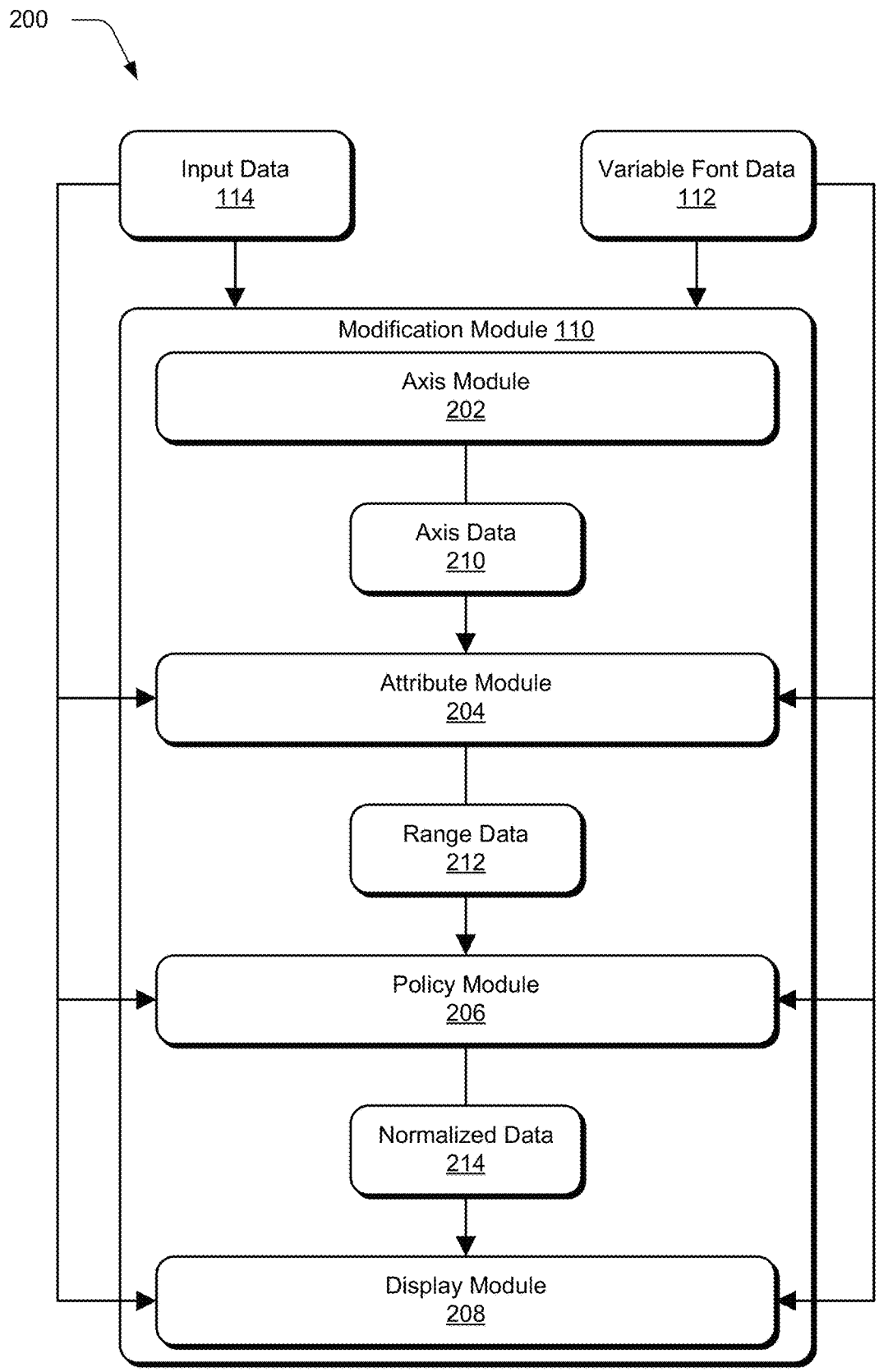
FIG. 2 depicts a system in an example implementation showing operation of a modification module for simultaneously modifying multiple variable fonts.

FIG. 2 depicts a system 200 in an example implementation showing operation of a modification module 110. The modification module 110 is illustrated to include an axis module 202, an attribute module 204, a policy module 206, and a display module 208. The axis module 202 receives the variable font data 112 and the input data 114 as inputs and processes the input data 114 and/or the variable font data 112 to generate axis data 210.

Figure 3A:
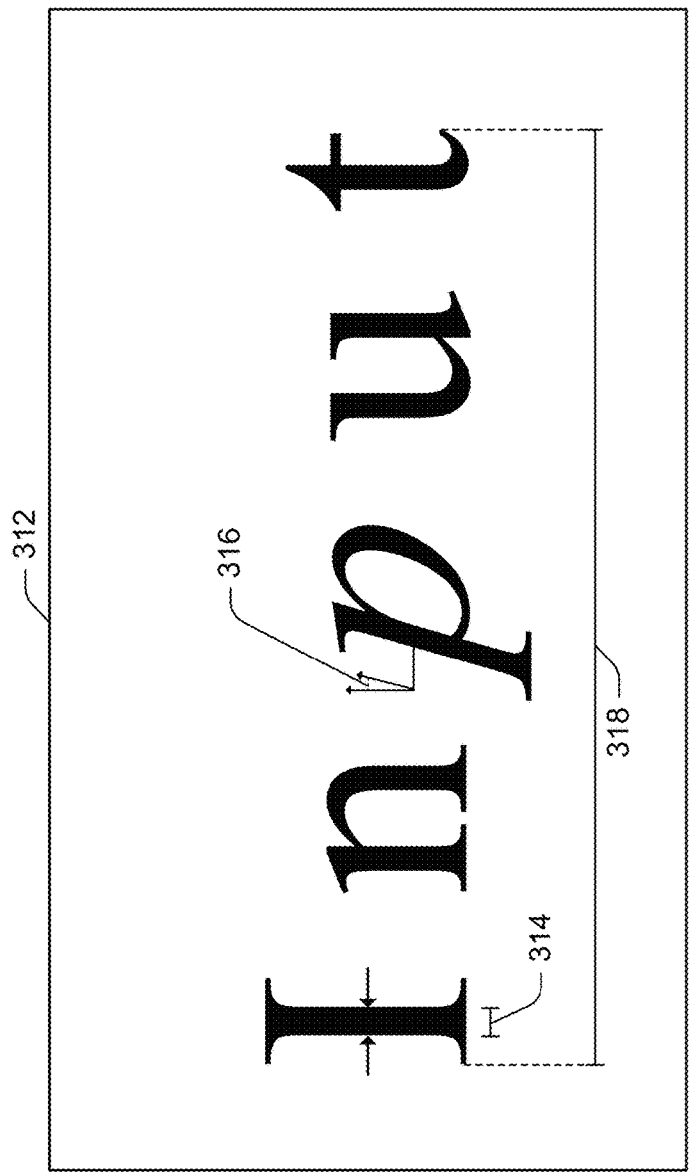
Figure 3B:
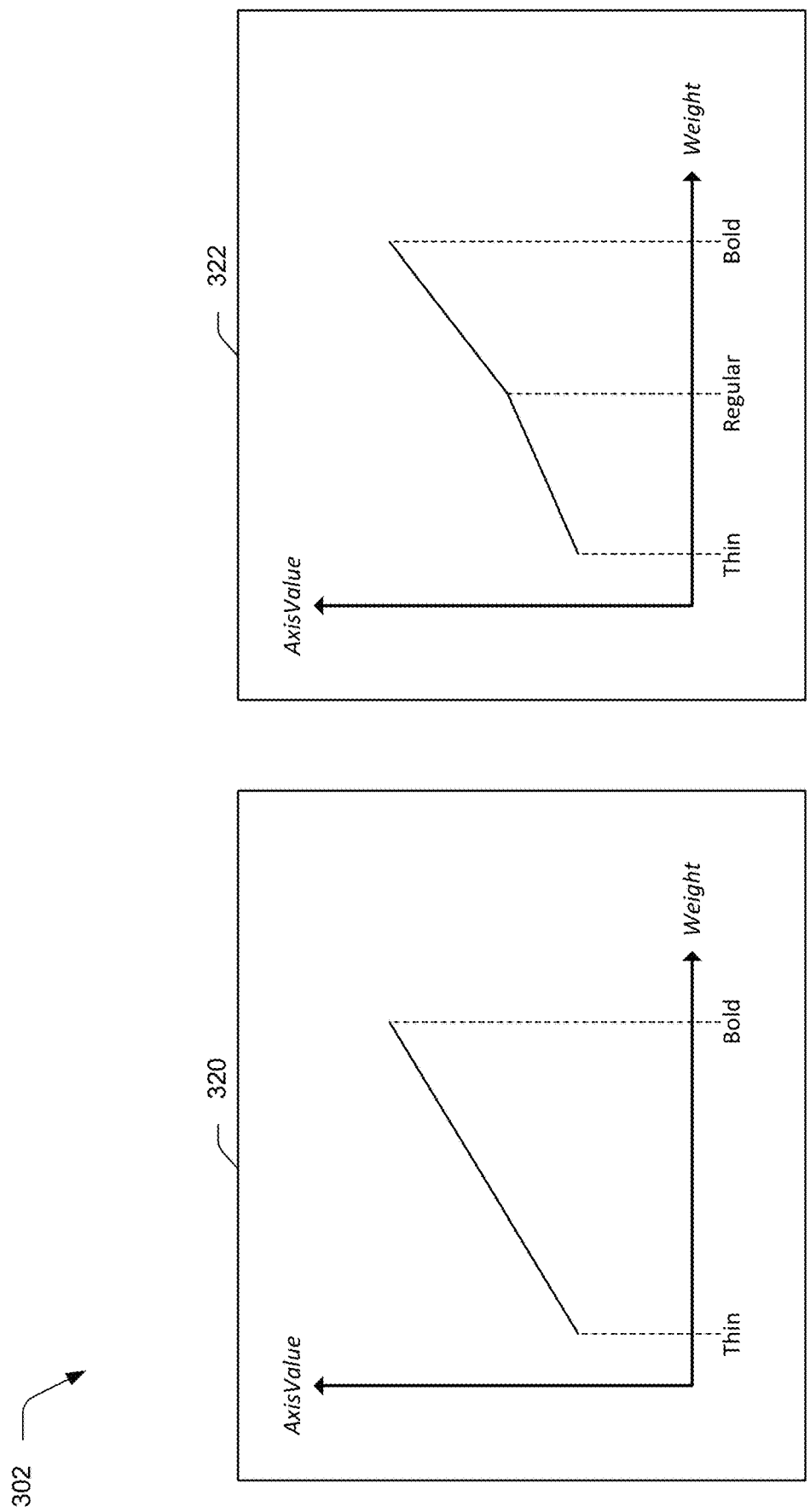
Figure 3D:
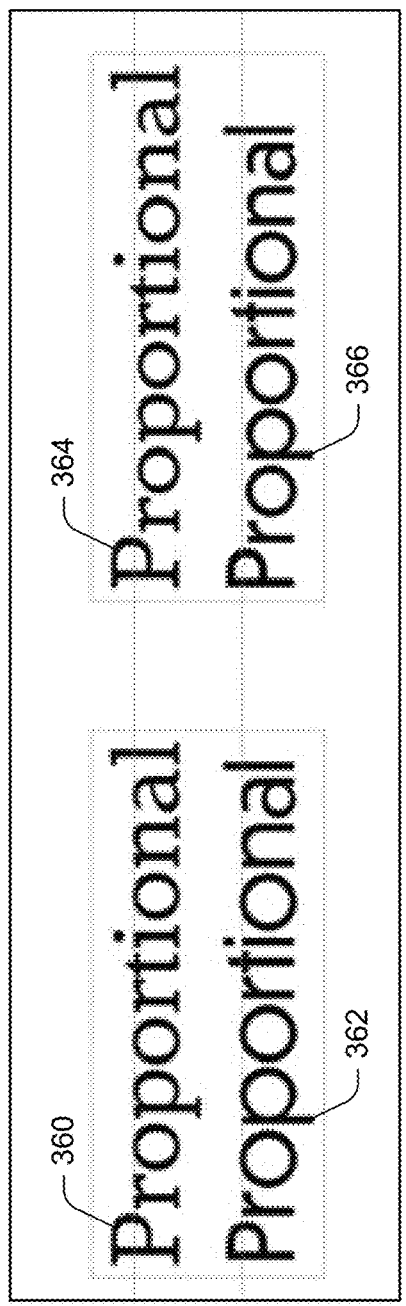
Figure 3E:
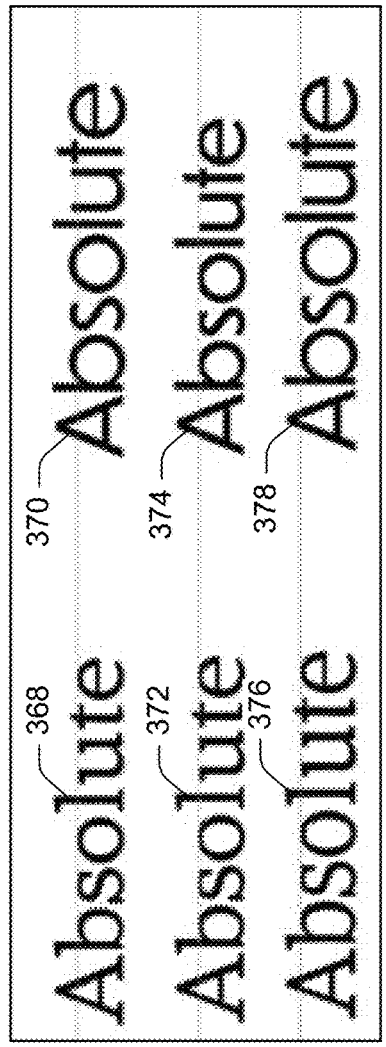
Figure 37:
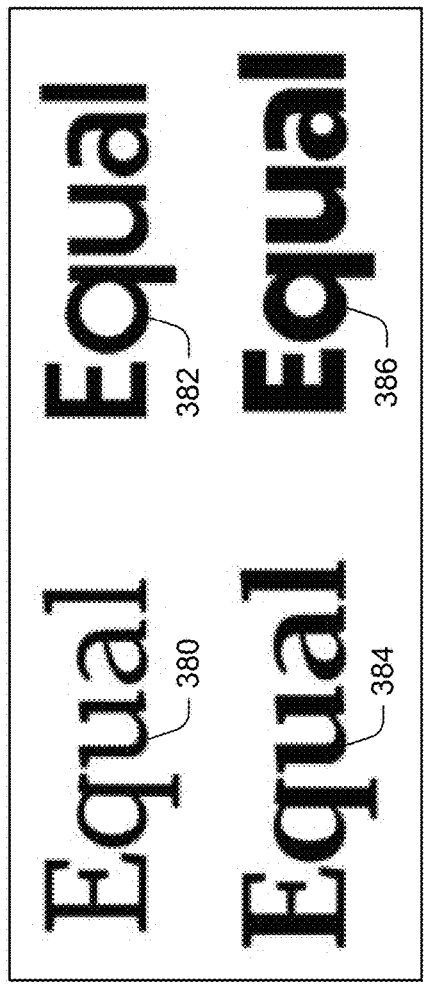

FIGS. 3A, 3B, 3C, 3D, 3E, and 3F illustrate examples of simultaneously modifying multiple variable fonts. FIG. 3A illustrates an example representation 300 of glyph attribute values of glyphs rendered using an instance of a variable font as described by the variable font data 112. FIG. 3B illustrates an example representation 302 of relationships between design axis values and glyph attribute values as described by the variable font data 112. FIG. 3C illustrates a representation 304 of determining an overlapping range of glyph attribute values. FIG. 3D illustrates a representation 306 of simultaneously modifying multiple variable fonts based on a proportional adjustment policy. FIG. 3E illustrates a representation 308 of simultaneously modifying multiple variable fonts based on an absolute adjustment policy. FIG. 3F illustrates a representation 310 of simultaneously modifying multiple variable fonts based on an equal adjustment policy.

As shown in FIG. 3A, the representation 300 includes glyphs rendered using an example instance of a variable font 312 of the variable fonts available to the modification module 110. For example, the variable font data 112 describes a Weight value 314 based on a thickness of a vertical stem of a glyph of the example instance of the variable font 312. The variable font data 112 describes a Slant value 316 based on an angle between a vertical stem and a y-axis of a bounding box of a glyph of the example instance of the variable font 312. As illustrated, the variable font data 112 describes a Width value 318 as a distance between origins of consecutive glyphs of the example instance of the variable font 312.

In one example, the modification module 110 receives and/or accesses the variable font data 112 describing the Weight value 314, the Slant value 316, and the Width value 318. In another example, the modification module 110 generates the variable font data 112 by connecting control points of glyphs rendered using instances of variable fonts with polylines. In this example, the modification module 110 calculates the Weight value 314, the Slant value 316, and the Width value 318 using coordinates of the polylines.

The variable font data 112 also describes relationships between values of the attributes of glyphs rendered using instances of the variable fonts available to the modification module 110 and values of design axes of the variable fonts such as Italic axes, Optical Size axes, Slant axes, Width axes, Weight axes, xHeight axes, CapHeight axes, Ascent axes, Decent axes, and so forth. The representation 302 depicted in FIG. 3B illustrates examples of relationships between attribute values of glyphs and design axis values of variable fonts. In one example, these relationships are expressible as:

$$AxisValue = k * GlyphAttribute + C$$

where: AxisValue is a value of a design axis; GlyphAttribute is a glyph attribute value; and k and C are constants.

It is to be appreciated that for a single glyph attribute (e.g., Weight), the relationship between values of the single glyph attribute and values of the design axis of a variable font includes a linear equation or multiple linear equations with varying k and C constants based on a number of masters included in the variable font. This is illustrated by a first example 320 and a second example 322 of determined relationships between design axis values of variable fonts and Weight values of glyphs rendered using instances of the variable fonts. The first example 320 illustrates a single linear relationship between the design axis values and the Weight values for a variable font which is interpolated between first and second masters of the variable font (e.g., Thin and Bold). The second example 322 illustrates a relationship between the design axis values and the Weight values for a variable font which includes multiple linear relationships. As shown, the second example 322 includes a first linear relationship interpolated between first and second masters (e.g., Thin and Regular) and a second linear relationship interpolated between second and third masters (e.g., Regular and Bold) of the variable font.

As shown in FIG. 2, the axis module 202 receives the input data 114 which describes glyphs rendered using instances of multiple variable fonts. The axis module 202 processes the input data 114 and determines a common design axis which is included in each of the multiple variable fonts described by the input data 114. To do so in one example, the axis module 202 extracts axis tags of each design axis included in the multiple variable fonts described by the input data 114 and compares these axis tags to identify the common design axis or common design axes. The axis module 202 generates the axis data 210 as describing the common design axis or common design axes.

The attribute module 204 receives the axis data 210, the variable font data 112, and the input data 114 and processes the axis data 210, the variable font data 112, and/or the input data 114 to generate range data 212. With reference to FIG. 3C, the input data 114 describes glyphs rendered using an instance of a first variable font 324 and an instance of a second variable font 326. For example, the first variable font 324 is AmsterlvarAlpha and the second variable font 326 is DunbarVariable. The axis data 210 describes a common design axis 328 which is included in the first variable font 324 and the second variable font 326. In one example, the common design axis 328 is an xHeight design axis. In another example, the common design axis 328 is an Italic axis, an Optical Size axis, a Slant axis, a Width axis, a Weight axis, a CapHeight axis, an Ascent axis, a Decent axis, etc.

As shown, the common design axis 328 of the first variable font 324 has a range of adjustable design axis values between a first minimum design axis value 330 and a first maximum design axis value 332. A particular design axis value within this range is specified by a first indicated design axis value 334. For example, the first minimum design axis value 330 is 890, the first maximum design axis value 332 is 1200, and the first indicated design axis value 334 is 1000. As previously described, the first indicated design axis value 334 is changeable within the range of design axis values of the common design axis 328 to adjust a first indicated glyph attribute value 336 within a first range of values 338 of a glyph attribute.

In the illustrated example, the first range of values 338 of the glyph attribute has a first minimum glyph attribute value 340 and a first maximum glyph attribute value 342. In one example, the glyph attribute is xHeight and the first minimum glyph attribute value 340 is 444, the first maximum glyph attribute value 342 is 600, and the first indicated glyph attribute value 336 is 500. The first minimum design axis value 330 corresponds to the first minimum glyph attribute value 340 and the first maximum design axis value 332 corresponds to the first maximum glyph attribute value 342. Similarly, the first indicated design axis value 334 corresponds to the first indicated glyph attribute value 336. The variable font data 112 describes a relationship between the first indicated design axis value 334 and the first indicated glyph attribute value 336. For example, the variable font data 112 describes this relationship as a single linear relationship as in the first example 320 or as including multiple linear relationships as in the second example 322.

As shown in FIG. 3C, the common design axis 328 of the second variable font 326 has a range of adjustable design axis values between a second minimum design axis value 344 and a second maximum design axis value 346. For example, the common design axis 328 of the second variable font 326 also includes a second indicated design axis value 348. In one example, the second minimum design axis value 344 is 353, the second maximum design axis value 346 is 574, and the second indicated design axis value 348 is 574. The second indicated design axis value 348 is changeable within the range of design axis values of the common design axis 328 to adjust a second indicated glyph attribute value 350 within a second range of values 352 of the glyph attribute.

The second range of values 352 of the glyph attribute has a second minimum glyph attribute value 354 and a second maximum glyph attribute value 356. For example, the glyph attribute is xHeight and the second minimum glyph attribute value 354 is 332, the second maximum glyph attribute value 356 is 570, and the second indicated glyph attribute value 350 is 570. The attribute module 204 determines an overlapping range of values 358 of the glyph attribute between the first range of values 338 of the glyph attribute and the second range of values 352 of the glyph attribute. To do so, the attribute module 204 computes an intersection between the first range of values 338 and the second range of values 352 of the glyph attribute.

As illustrated, the attribute module 204 determines a minimum glyph attribute value of the overlapping range of values 358 as a maximum of the first minimum glyph attribute value 340 which is 444 and the second minimum glyph attribute value 354 which is 332. Since the first minimum glyph attribute value 340 is greater than the second minimum glyph attribute value 354, the attribute module 204 determines that the minimum glyph attribute value of the overlapping range of values 358 is equal to the first minimum glyph attribute value 340. The attribute module 204 determines a maximum glyph attribute value of the overlapping range of values 358 as a minimum of the first maximum glyph attribute value 342 which is 600 and the second maximum glyph attribute value 356 which is 570. Because the second maximum glyph attribute value 356 is less than the first maximum glyph attribute value 342, the attribute module 204 determines that the maximum glyph attribute value of the overlapping range of values 358 is equal to the second maximum glyph attribute value 356.

By determining the overlapping range of values 358 in this manner, the attribute module 204 ensures that the glyph attribute values within the overlapping range of values 358 are included in both the first range of values 338 and the second range of values 352 of the glyph attribute. For example, a particular glyph attribute value within the overlapping range of values 358 corresponds to a particular design axis value of the common design axis 328 of the first variable font 324 and also corresponds to a particular design axis value of the common design axis 328 of the second variable font 326. The attribute module 204 generates the range data 212 as describing the overlapping range of values 358 of the glyph attribute.

Although the representation 304 includes two variable fonts 324, 326, it is to be appreciated that the attribute module 204 is capable of determining the overlapping range of values 358 for any number of variable fonts that include the common design axis 328. To do so, the attribute module 204 computes an intersection of ranges of glyph attribute values which correspond to values of the common design axis 328 for each variable font having the common design axis 328. It is also to be appreciated that the first variable font 324 and the second variable font 326 are capable of having more than one common design axis 328 in some examples. In one example, the first variable font 324 and the second variable font 326 have an additional common design axis 328. In this example, the additional common design axis 328 includes design axis values which are changeable to adjust values of the glyph attribute. In another example, the additional common design axis 328 includes design axis values which are changeable to adjust values of an additional glyph attribute.

As illustrated in FIG. 2, the policy module 206 receives the range data 212, the variable font data 112, and the input data 114 and processes the range data 212, the variable font data 112, and/or the input data 114 to generate normalized data 214. The policy module 206 generates the normalized data 214 based on a policy for simultaneously modifying multiple variable fonts. For example, the range data 212 describes the overlapping range of values 358 of the glyph attribute and this overlapping range of values 358 is usable to simultaneously modify multiple variable fonts in several different ways. In this example, the different ways of simultaneously modifying multiple variable fonts are based on a proportional adjustment policy, an absolute adjustment policy, an equal adjustment policy, and so forth.

In one example, the input data 114 describes an indication of a policy for simultaneously modifying multiple variable fonts. In another example, the policy module 206 determines a policy for simultaneously modifying multiple variable fonts such as a default policy for modifying multiple variable fonts. Consider an example in which the policy module 206 generates the normalized data 214 based on a proportional adjustment policy. In this example, the policy module 206 computes a ratio of the first indicated glyph attribute value 336 and the second indicated glyph attribute value 350 which is expressible as:

$$R = \frac{V_{nf}}{V_{nf'}}$$

where: R is the ratio; $V_{nf}$ is a current glyph attribute value of a variable font; and $V_{nf'}$ is a current glyph attribute value of an additional variable font.

After computing the ratio R, the policy module 206 assigns values 0 and 1 to a minimum and a maximum of the overlapping range of values 358 of the glyph attribute, respectively. For example, this is expressible as:

$$\min = \operatorname{maximum}\left(P_{nfmin}, \frac{P_{nf'min}}{R}\right)$$

$$\max = \operatorname{minimum}\left(P_{nfmax}, \frac{P_{nf'max}}{R}\right)$$

where: R is the ratio; $P_{nf\ min}$ is a minimum of a range of glyph attribute values adjustable using the variable font; $P_{nf'min}$ is a minimum of a range of glyph attribute values adjustable using the additional variable font; $P_{nf\ max}$ is a maximum of the range of glyph attribute values adjustable using the variable font; and $P_{nf'max}$ is a maximum of the range of glyph attribute values adjustable using the additional variable font.

After computing the overlapping range for the proportional adjustment policy, the policy module 206 generates the normalized data 214 as describing a simultaneous proportional modification of the variable font and the additional variable font. In one example, this is expressible as:

$$V'_{nf} = X^* \operatorname{range}(P_{nf'}) + \min(P_{nf'})$$

$$V'_{nf} = \frac{V'_{nf'}}{R}$$

where: R is the ratio; $P_{nf'}$ is the overlapping range of glyph attribute values for the proportional adjustment policy; X is the normalized value; $V'_{nf'}$ is a proportional glyph attribute value for the variable font; and $V'_{nf}$ is a proportional glyph attribute value for the additional variable font.

Consider an example in which the policy module 206 generates the normalized data 214 using the example shown in FIG. 3C with respect to the first variable font 324 and the second variable font 326. In this example, the ratio R is computed as the first indicated glyph attribute value 336 divided by the second indicated glyph attribute value 350 which is 500/570 or approximately 0.877. Continuing this example, a minimum absolute value for the glyph attribute is a maximum of the first minimum glyph attribute value 340 and the second minimum glyph attribute value 354 divided by the ratio R which is 444. A maximum absolute value for the glyph attribute is a minimum of the first maximum glyph attribute value 342 and the second maximum glyph attribute value 356 divided by the ratio R which is 600. Accordingly, $P_{nf'}$ is (444, 600); min ($P_{nf'}$) is 444; and range ($P_{nf'}$) is 600 minus 444 or 156. From this, X is the first indicated glyph attribute value 336 minus min ($P_{nf'}$) divided by range($P_{nf'}$) which is approximately 0.36. For example, an adjustment of X from 0.36 to 0.25 corresponds to an additional instance of the first variable font 324 usable to render glyphs having glyph attribute values of approximately 483. In this example, this also corresponds to an additional instance of the second variable font 326 usable to render glyphs having glyph attribute values of 483 divided by the ratio R which is approximately 550.

In an example in which the policy module 206 generates the normalized data 214 based on the proportional adjustment policy, the display module 208 receives the normalized data 214, the variable font data 112, and the input data 114 and processes the normalized data 214, the variable font data 112, and/or the input data 114 to generate and display instances of variable fonts based on the proportional adjustment policy. With respect to FIG. 3D, the representation 306 includes an instance of a first variable font 360 and an instance of a second variable font 362. The input data 114 describes a simultaneous modification of an xHeight value of glyphs of the first variable font 360 and glyphs of the second variable font 362 based on the proportional adjustment policy. As shown, the display module 208 displays an additional instance of the first variable font 364 and an additional instance of the second variable font 366 which have modified xHeight values.

In particular, glyphs rendered using the additional instance of the first variable font 364 have lower xHeight values than glyphs rendered using the instance of the first variable font 360. The glyphs rendered using the additional instance of the second variable font 366 have lower xHeight values than the glyphs rendered using the instance of the second variable font 362. A comparison of xHeight values between the glyphs rendered using the instance of the first variable font 360 and the glyphs rendered using the instance of the second variable font 362 indicates that the glyphs rendered using the instance of the second variable font 362 have greater xHeight values than the glyphs rendered using the instance of the first variable font 360. A similar comparison between xHeight values of the glyphs rendered using the additional instance of the first variable font 364 and the glyphs rendered using the additional instance of the second variable font 366 indicates that the glyphs rendered the additional instance of the second variable font 366 have greater xHeight values than the glyphs rendered using the additional instance of the first variable font 364.

Consider another example in which the policy module 206 generates the normalized data 214 based on an absolute adjustment policy instead of the proportional adjustment policy. In this example, the policy module 206 uses the overlapping range of values 358 of the glyph attribute as absolute glyph attribute values and generates the normalized data 214 as describing these absolute glyph attribute values. The display module 208 receives the normalized data 214, the variable font data 112, and the input data 114 and processes the normalized data 214, the variable font data 112, and/or the input data 114 to generate and display instances of variable fonts based on the absolute adjustment policy.

As shown in FIG. 3E, the input data 114 describes a selection of multiple variable fonts and the display module 208 displays an instance of a first variable font 368 and an instance of a second variable font 370. Glyphs rendered using the instance of the first variable font 368 have lower xHeight values than glyphs rendered using the instance of the second variable font 370. In an example in which the input data 114 also describes a user input specifying an xHeight value of the glyphs rendered using the instance of the first variable font 368, the display module 208 generates and displays an additional instance of the first variable font 372 and an additional instance of the second variable font 374.

As illustrated, glyphs rendered using the additional instance of the first variable font 372 have xHeight values which are the same as the xHeight values of the glyphs rendered using the instance of the first variable font 368. However, glyphs rendered using the additional instance of the second variable font 374 have lower xHeight values than the glyphs rendered using the instance of the second variable font 370. Moreover, the xHeight values of the glyphs rendered using the additional instance of the first variable font 372 and are the same as the xHeight values of the glyphs rendered using the additional instance of the second variable font 374.

Consider another example in which the input data 114 also describes a user input modifying the xHeight values of the glyphs rendered using the additional instance of the first variable font 372. In this example and in response to receiving the user input described by the input data 114, the display module 208 generates and displays a second additional instance of the first variable font 376 and a second additional instance of the second variable font 378. As shown, glyphs rendered using the second additional instance of the first variable font 376 have xHeight values that are greater than the xHeight values of the glyphs rendered using the additional instance of the first variable font 372. As further shown, glyphs rendered using the second additional instance of the second variable font 378 have xHeight values that are the same as the xHeight values of the glyphs rendered using the second additional instance of the first variable font 376.

Consider an example in which the policy module 206 generates the normalized data 214 based on an equal adjustment policy instead of the absolute adjustment policy or the proportional adjustment policy. In this example, and with respect to FIG. 3C, the policy module 206 determines differences between the first and second indicated glyph attribute values 336, 350 and the minimum and maximum glyph attribute values of the overlapping range of values 358. These differences represent an amount by which the glyph attribute is adjustable within the overlapping range of values 358 relative to the first and second indicated glyph attribute values 336, 350. In one example, this is expressible as:

$$\text{maxAdjust} = \max(P_{nf}) - V_{nf}$$

$$\text{minAdjust} = V_{nf} - \min(P_{nf})$$

where: $P_{nf}$ is the overlapping range of values of the glyph attribute for the equal adjustment policy; and $V_{nf}$ is a current glyph attribute value for each variable font.

For example, the policy module 206 maps maxAdjust to 1 and minAdjust to 0 as the normalized values X and generates the normalized data 214 as describing this mapping. The display module 208 receives the normalized data 214, the variable font data 112 and the input data 114 and processes the normalized data 214, the variable font data 112, and/or the input data 114 to generate and display instances of variable fonts based on the equal adjustment policy. In an example, this is representable as:

$$\text{range} = \text{maxAdjust} - \text{minAdjust}$$

$$V'_{nf} = X * \text{range} + V_{nf}$$

where: $V_{nf}$ is a current glyph attribute value for an instance of a variable font; X is the normalized value; and $V'_{nf}$ is an equal glyph attribute value for the variable font.

As illustrated in FIG. 3F, the input data 114 describes a selection of multiple variable fonts and the display module 208 displays an instance of a first variable font 380 and an instance of a second variable font 382. Glyphs rendered using the instance of the second variable font 382 have greater Weight values than glyphs rendered using the instance of the first variable font 382. Consider an example in which the input data 114 also describes a user input modifying a Weight value of the glyphs rendered using the instance of the first variable font 380. In this example, the display module 208 generates and displays an additional instance of the first variable font 384 and an additional instance of the second variable font 386.

As shown, glyphs rendered using the additional instance of the first variable font 384 have greater Weight values than the glyphs rendered using the instance of the first variable font 382. Similarly, glyphs rendered using the additional instance of the second variable font 386 have greater Weight values than the glyphs rendered using the instance of the second variable font 382. A comparison of the glyphs rendered using the additional instance of the first variable font 384 with the glyphs rendered using the instance of the variable font 380 as well as a comparison of the glyphs rendered using the additional instance of the second variable font 386 with the glyphs rendered using the instance of the second variable font 382 indicates that Weight values of the instances 384, 386 are increased by an equal delta relative to Weight values of the instances 380, 382, respectively.

In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable individually, together, and/or combined in different ways. Thus, individual functionality, features, and concepts described in relation to different example environments, devices, components, figures, and procedures herein are usable in any suitable combinations and are not limited to the particular combinations represented by the enumerated examples in this description.

Example Procedures

The following discussion describes techniques which are implementable utilizing the previously described systems and devices. Aspects of each of the procedures are implementable in hardware, firmware, software, or a combination thereof. The procedures are shown as a set of blocks that specify operations performed by one or more devices and are not necessarily limited to the orders shown for performing the operations by the respective blocks. In portions of the following discussion, reference is made to FIGS. 1-3. FIG. 4 is a flow diagram depicting a procedure 400 in an example implementation in which a glyph attribute of glyphs rendered using an instance of a first variable font and an instance of a second variable font is simultaneously modified by generating an additional instance of the first variable font and an additional instance of the second variable font.

Input data is received describing a selection of glyphs rendered using an instance of a first variable font and an instance of a second variable font, (block 402), the first variable font and the second variable font have a design axis in common. In one example, the computing device 102 implements the modification module 110 to receive the input data. A first range of values of a glyph attribute are identified that are adjustable by changing values of the design axis of the first variable font (block 404). For example, the modification module 110 identifies the first range of values of the glyph attribute.

A second range of values of the glyph attribute are identified that are adjustable by changing values of the design axis of the second variable font (block 406). In an example, the modification module 110 identifies the second range of values of the glyph attribute. An overlapping range of values of the glyph attribute between the first range of values and the second range of values is determined (block 408). For example, the modification module 110 determines the overlapping range of values of the glyph attribute. An additional instance of the first variable font and an additional instance of the second variable font are generated for display in a user interface of a display device based on the overlapping range of values of the glyph attribute (block 410). The computing device 102 implements the modification module 110 to generate the additional instance of the first variable font and the additional instance of the second variable font in one example.

Figure 5:
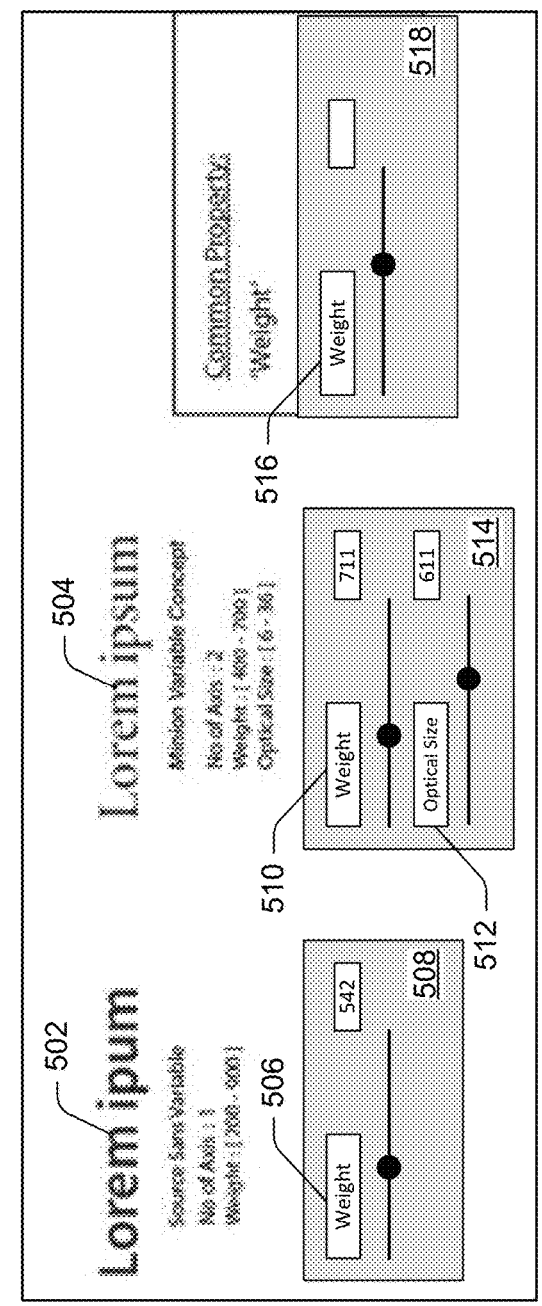
FIG. 5 illustrates an example user interface for simultaneously modifying multiple variable fonts.

FIG. 5 illustrates an example user interface 500 for simultaneously modifying multiple variable fonts. The user interface 500 is illustrated to include an indication 502 of a first variable font and an indication 504 of a second variable font. For example, the first variable font includes one design axis which is a Weight design axis. An indication 506 of the Weight design axis of the first variable font is displayed in a first user interface element 508 of the user interface 500.

In the illustrated example, the second variable font includes two design axes which are a Weight design axis and an Optical Size design axis. An indication 510 of the Weight design axis and an indication 512 of the Optical Size design axis are displayed in a second user interface element 514 of the user interface 500. An indication 516 of a common design axis for the first variable font and the second variable font is displayed in a third user interface element 518 of the user interface. As shown, the common design axis is the Weight design axis that is included in both the first variable font and the second variable font.

FIG. 6 illustrates an example 600 of generating instances of variable fonts based on a value of a visual feature of a graphic object and based on a value of a glyph attribute of glyphs rendered using a non-variable font. The example 600 includes a first workflow 602 and a second workflow 604. In the first workflow 602 an instance of a variable font 606 is displayed next to a graphic object 608 which is a rectangle in this example. For example, the modification module 110 determines a stroke width of the graphic object 608 as equal to a 7-point stroke width. In this example, the modification module 110 determines the stroke width of the graphic object 608 by connecting control points of the graphic object 608 with polylines and using coordinates of these polylines to compute the stroke width.

After determining the stroke width of the graphic object 608, the modification module 110 determines a design axis value of a Weight design axis of the variable font which corresponds to a Weight attribute value that matches the stroke width of the graphic object 608. As shown, the modification module 110 applies the determined design axis value to the Weight design axis of the variable font and generates the instance of the variable font 606. Glyphs rendered using the instance of the variable font 606 have Weight values that match the stroke width of the graphic object 608.

In some examples, the modification module 110 generates the instance of the variable font 606 automatically and without user intervention. For example, the computing device 102 implements the modification module 110 to generate and display the instance of the variable font 606 based on a different instance of the variable font being rendered within a threshold proximity of the graphic object 608. In another example, the modification module 110 generates the instance of the variable font 606 based on glyphs rendered using the different instance of the variable font having Weight values corresponding to a glyph stem thickness within a threshold amount of the stroke width of the graphic object 608.

In the second workflow, glyphs rendered using a non-variable font 610 are displayed next to glyphs rendered using an instance of a variable font 612. For example, the modification module 110 determines a Weight value of the glyphs rendered using the non-variable font 610 by connecting control points of these glyphs with polylines and computing the Weight value. After the Weight value of the glyphs rendered using the non-variable font 610 is computed, the modification module 110 determines a design axis value of a Weight design axis of the variable font that corresponds to a Weight value that matches the Weight value of the glyphs rendered using the non-variable font 610. The modification module 110 applies the design axis value to the Weight design axis and generates an additional instance of the variable font 614. As shown, glyphs rendered using the additional instance of the variable font 614 have Weight values that match Weight values of the glyphs rendered using the non-variable font 610.

In some examples, the modification module 110 generates the additional instance of the variable font 614 automatically and without user intervention. For example, the modification module 110 generates and displays the additional instance of the variable font 614 based on a proximity of the instance of the variable font 612 being less than a threshold distance from the glyphs rendered using the non-variable font 610. In another example, the modification module 110 generates the additional instance of the variable font 614 based on glyphs rendered using the instance of the variable font 612 having Weight values within a threshold amount of the Weight values of the glyphs rendered using the non-variable font 610.

Example System and Device

Figure 7:
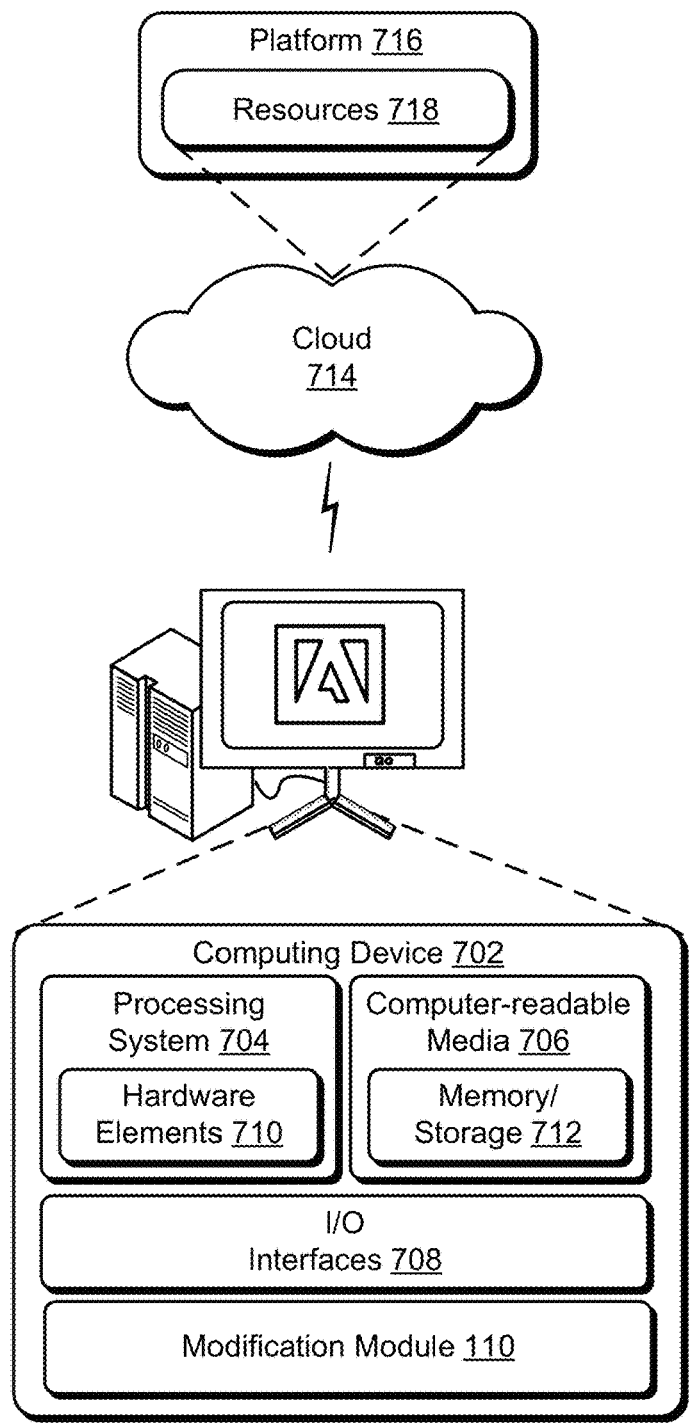
FIG. 7 illustrates an example system that includes an example computing device that is representative of one or more computing systems and/or devices for implementing the various techniques described herein.

FIG. 7 illustrates an example system 700 that includes an example computing device that is representative of one or more computing systems and/or devices that are usable to implement the various techniques described herein. This is illustrated through inclusion of the modification module 110. The computing device 702 includes, for example, a server of a service provider, a device associated with a client (e.g., a client device), an on-chip system, and/or any other suitable computing device or computing system.

The example computing device 702 as illustrated includes a processing system 704, one or more computer-readable media 706, and one or more I/O interfaces 708 that are communicatively coupled, one to another. Although not shown, the computing device 702 further includes a system bus or other data and command transfer system that couples the various components, one to another. For example, a system bus includes any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 704 is representative of functionality to perform one or more operations using hardware. Accordingly, the processing system 704 is illustrated as including hardware elements 710 that are configured as processors, functional blocks, and so forth. This includes example implementations in hardware as an application specific integrated circuit or other logic device formed using one or more semiconductors. The hardware elements 710 are not limited by the materials from which they are formed or the processing mechanisms employed therein. For example, processors are comprised of semiconductor(s) and/or transistors (e.g., electronic integrated circuits (ICs)). In such a context, processor-executable instructions are, for example, electronically-executable instructions.

The computer-readable media 706 is illustrated as including memory/storage 712. The memory/storage 712 represents memory/storage capacity associated with one or more computer-readable media. In one example, the memory/storage 712 includes volatile media (such as random access memory (RAM)) and/or nonvolatile media (such as read only memory (ROM), Flash memory, optical disks, magnetic disks, and so forth). In another example, the memory/storage 712 includes fixed media (e.g., RAM, ROM, a fixed hard drive, and so on) as well as removable media (e.g., Flash memory, a removable hard drive, an optical disc, and so forth). The computer-readable media 706 is configurable in a variety of other ways as further described below.

Input/output interface(s) 708 are representative of functionality to allow a user to enter commands and information to computing device 702, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which employs visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 702 is configurable in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques are implementable on a variety of commercial computing platforms having a variety of processors.

Implementations of the described modules and techniques are storable on or transmitted across some form of computer-readable media. For example, the computer-readable media includes a variety of media that is accessible to the computing device 702. By way of example, and not limitation, computer-readable media includes "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which are accessible to a computer.

"Computer-readable signal media" refers to a signal-bearing medium that is configured to transmit instructions to the hardware of the computing device 702, such as via a network. Signal media typically embodies computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 710 and computer-readable media 706 are representative of modules, programmable device logic and/or fixed device logic implemented in a hardware form that is employable in some embodiments to implement at least some aspects of the techniques described herein, such as to perform one or more instructions. Hardware includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are also employable to implement various techniques described herein. Accordingly, software, hardware, or executable modules are implementable as one or more instructions and/or logic embodied on some form of computer-readable storage media and/or by one or more hardware elements 710. For example, the computing device 702 is configured to implement particular instructions and/or functions corresponding to the software and/or hardware modules. Accordingly, implementation of a module that is executable by the computing device 702 as software is achieved at least partially in hardware, e.g., through use of computer-readable storage media and/or hardware elements 710 of the processing system 704. The instructions and/or functions are executable/operable by one or more articles of manufacture (for example, one or more computing devices 702 and/or processing systems 704) to implement techniques, modules, and examples described herein.

The techniques described herein are supportable by various configurations of the computing device 702 and are not limited to the specific examples of the techniques described herein. This functionality is also implementable entirely or partially through use of a distributed system, such as over a "cloud" 714 as described below.

The cloud 714 includes and/or is representative of a platform 716 for resources 718. The platform 716 abstracts underlying functionality of hardware (e.g., servers) and software resources of the cloud 714. For example, the resources 718 include applications and/or data that are utilized while computer processing is executed on servers that are remote from the computing device 702. In some examples, the resources 718 also include services provided over the Internet and/or through a subscriber network, such as a cellular or Wi-Fi network.

The platform 716 abstracts the resources 718 and functions to connect the computing device 702 with other computing devices. In some examples, the platform 716 also serves to abstract scaling of resources to provide a corresponding level of scale to encountered demand for the resources that are implemented via the platform. Accordingly, in an interconnected device embodiment, implementation of functionality described herein is distributable throughout the system 700. For example, the functionality is implementable in part on the computing device 702 as well as via the platform 716 that abstracts the functionality of the cloud 714.

Conclusion

Although implementations of systems for simultaneously modifying multiple variable fonts have been described in language specific to structural features and/or methods, it is to be understood that the appended claims are not necessarily limited to the specific features or methods described. Rather, the specific features and methods are disclosed as example implementations of systems for simultaneously modifying multiple variable fonts, and other equivalent features and methods are intended to be within the scope of the appended claims. Further, various different examples are described and it is to be appreciated that each described example is implementable independently or in connection with one or more other described examples.

What is claimed is:

1. In a digital medium environment to simultaneously modify a glyph attribute of glyphs rendered using an instance of a first variable font and an instance of a second variable font, a method implemented by a processing device, the method comprising:

generating, by the processing device, instances of the first variable font using a particular design axis of the first variable font, the particular design axis is common to the first variable font and the second variable font;

connecting, by the processing device, control points of glyphs rendered using the instances of the first variable font with polylines;

determining, by the processing device, a relationship between values of the glyph attribute and values of the particular design axis using coordinates of the polylines;

identifying, by the processing device, a first range of values of the glyph attribute that are adjustable by changing values of the particular design axis of the first variable font based on the relationship;

identifying, by the processing device, a second range of values of the glyph attribute that are adjustable by changing values of the particular design axis of the second variable font;

determining, by the processing device, an overlapping range of values of the glyph attribute between the first range of values and the second range of values; and generating, by the processing device for display in a user interface of a display device, an additional instance of the first variable font and an additional instance of the second variable font based on the overlapping range of values of the glyph attribute.

2. The method as described in claim 1, wherein the glyph attribute is at least one of a Weight, a Width, or a Slant.

3. The method as described in claim 1, wherein the particular design axis is Italic, Optical Size, Slant, Width, Weight, xHeight, CapHeight, Ascent, or Decent.

4. The method as described in claim 1, wherein the additional instance of the first variable font and the additional instance of the second variable font are generated based on a proportional ratio computed by dividing a value of the glyph attribute for a glyph rendered using the instance of the first variable font by a value of the glyph attribute for a glyph rendered using the instance of the second variable font.

5. The method as described in claim 4, wherein a value of the glyph attribute for a glyph rendered using the additional instance of the second variable font is equal to a value of the glyph attribute for a glyph rendered using the additional instance of the first variable font divided by the proportional ratio.

6. The method as described in claim 4, wherein the overlapping range of values of the glyph attribute has a minimum value determined based on a maximum of:
   a minimum value of the glyph attribute in the first range of values; and
   a minimum value of the glyph attribute in the second range of values divided by the proportional ratio.

7. The method as described in claim 4, wherein the overlapping range of values of the glyph attribute has a maximum value determined based on a minimum of:
   a maximum value of the glyph attribute in the first range of values; and
   a maximum value of the glyph attribute in the second range of values divided by the proportional ratio.

8. The method as described in claim 1, wherein a glyph rendered using the additional instance of the first variable font has a same value of the glyph attribute as a glyph rendered using the additional instance of the second variable font.

9. The method as described in claim 1, wherein a difference between a value of the glyph attribute for a glyph rendered using the instance of the first variable font and a value of the glyph attribute for a glyph rendered using the additional instance of the first variable font is equal to a difference between a value of the glyph attribute for a glyph rendered using the instance of the second variable font and a value of the glyph attribute for a glyph rendered using the additional instance of the second variable font.

10. The method as described in claim 1, wherein a value of the glyph attribute for a glyph rendered using the additional instance of the first variable font is equal to at least one of:
    a value of a visual feature of a graphic object; or
    a value of the glyph attribute for a glyph rendered using a non-variable font.

11. In a digital medium environment to simultaneously modify a glyph attribute of glyphs rendered using an instance of a first variable font and an instance of a second variable font, a system comprising:
   an attribute module implemented in hardware of a processing device to:
      generate instances of the first variable font using a particular design axis of the first variable font, the particular design axis is common to the first variable font and the second variable font;
      connect control points of glyphs rendered using the instances of the first variable font with polylines;
      determine a relationship between values of the glyph attribute and values of the particular design axis using coordinates of the polylines;
      identify a first range of values of the glyph attribute that are adjustable by changing values of the particular design axis of the first variable font based on the relationship; and
      identify a second range of values of the glyph attribute that are adjustable by changing values of the particular design axis of the second variable font;
   a policy module implemented in the hardware of the processing device to determine an overlapping range of values of the glyph attribute between the first range of values and the second range of values; and
   a display module implemented in the hardware of the processing device to generate, for display in a user interface of a display device, an additional instance of the first variable font and an additional instance of the second variable font based on the overlapping range of values of the glyph attribute.

12. The system as described in claim 11, wherein the additional instance of the first variable font and the additional instance of the second variable font are generated based on a proportional ratio computed by dividing a value of the glyph attribute for a glyph rendered using the instance of the first variable font by a value of the glyph attribute for a glyph rendered using the instance of the second variable font.

13. The system as described in claim 12, wherein a value of the glyph attribute for a glyph rendered using the additional instance of the second variable font is equal to a value of the glyph attribute for a glyph rendered using the additional instance of the first variable font divided by the proportional ratio.

14. The system as described in claim 11, wherein a glyph rendered using the additional instance of the first variable font has a same value of the glyph attribute as a glyph rendered using the additional instance of the second variable font.

15. The system as described in claim 11, wherein a difference between a value of the glyph attribute for a glyph rendered using the instance of the first variable font and a value of the glyph attribute for a glyph rendered using the additional instance of the first variable font is equal to a difference between a value of the glyph attribute for a glyph rendered using the instance of the second variable font and a value of the glyph attribute for a glyph rendered using the additional instance of the second variable font.

16. The system as described in claim 11, wherein a value of the glyph attribute for a glyph rendered using the additional instance of the first variable font is equal to at least one of:
    a value of a visual feature of a graphic object; or
    a value of the glyph attribute for a glyph rendered using a non-variable font.

17. One or more computer-readable storage media comprising instructions stored thereon that, responsive to execution by a computing device, causes the computing device to perform operations including:
    generating instances of a first variable font using a design axis of the first variable font, the design axis is common to the first variable font and a second variable font;
    connecting control points of glyphs rendered using the instances of the first variable font with polylines;
    determining a relationship between values of a glyph attribute and values of the design axis using coordinates of the polylines;
    identifying a first range of values of the glyph attribute that are adjustable by changing values of the design axis of the first variable font based on the relationship;
    identifying a second range of values of the glyph attribute that are adjustable by changing values of the design axis of the second variable font;

determining an overlapping range of values of the glyph attribute between the first range of values and the second range of values; and generating, automatically and without user intervention, for display in a user interface of a display device, an instance of the first variable font and an instance of the second variable font based on the overlapping range of values of the glyph attribute.

18. The one or more computer-readable storage media as described in claim 17, wherein the instance of the first variable font and the instance of the second variable font are generated based on a proportional ratio computed by dividing a value of the glyph attribute for a glyph rendered using an additional instance of the first variable font by a value of the glyph attribute for a glyph rendered using an additional instance of the second variable font.

19. The one or more computer-readable storage media as described in claim 17, wherein a glyph rendered using the instance of the first variable font has a same value of the glyph attribute as a glyph rendered using the instance of the second variable font.

20. The one or more computer-readable storage media as described in claim 17, wherein a difference between a value of the glyph attribute for a glyph rendered using an additional instance of the first variable font and a value of the glyph attribute for a glyph rendered using the instance of the first variable font is equal to a difference between a value of the glyph attribute for a glyph rendered using an additional instance of the second variable font and a value of the glyph attribute for a glyph rendered using the instance of the second variable font.

\* \* \* \* \*